(No Model.)　　　　　　　　　　　　　　　　7 Sheets—Sheet 1.
A. DEY.
WORKMAN'S TIME RECORDER.

No. 411,586.　　　　　　　　　Patented Sept. 24, 1889.

Figure 1:
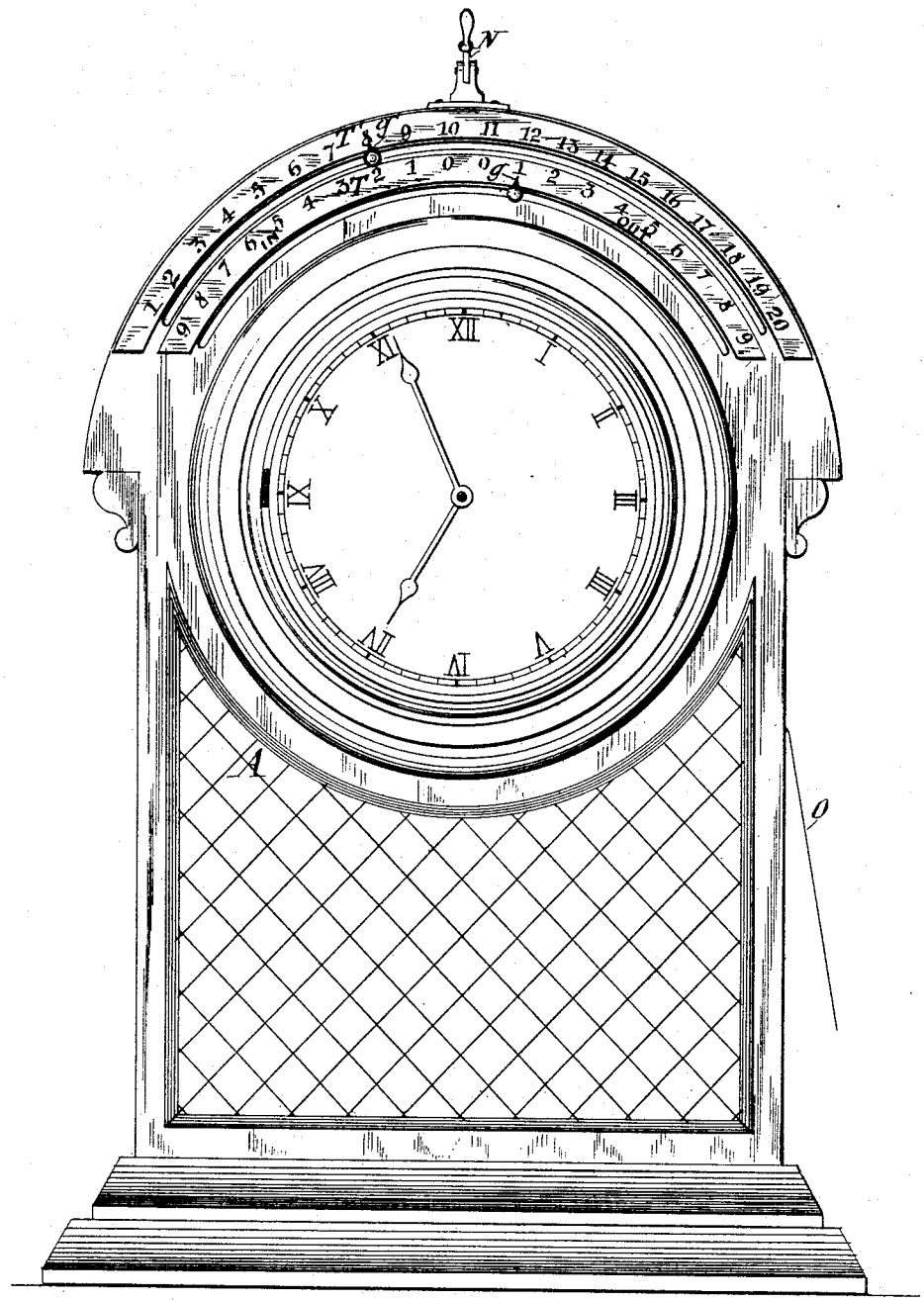

WITNESSES:　　　*Fig. 1*　　　　　INVENTOR
　　　　　　　　　　　　　　　　Alexander Dey
　　　　　　　　　　　　　　　　BY
　　　　　　　　　　　　　　　　ATTORNEYS (No Model.)  7 Sheets—Sheet 2.

A. DEY.
WORKMAN'S TIME RECORDER.

No. 411,586.  Patented Sept. 24, 1889.

WITNESSES:
C. L. Bendixon
J. J. Laass

INVENTOR
Alexander Dey
BY
Duell, Laass & Duell
ATTORNEYS (No Model.) 7 Sheets—Sheet 4.
A. DEY.
WORKMAN'S TIME RECORDER.

No. 411,586. Patented Sept. 24, 1889.

WITNESSES: INVENTOR
C. L. Bendixon Alexander Dey
J. J. Laass BY
  Huell, Laass & Huell
  ATTORNEYS (No Model.) 7 Sheets—Sheet 5.
A. DEY.
WORKMAN'S TIME RECORDER.

No. 411,586. Patented Sept. 24, 1889.

WITNESSES:
E. L. Bendicon
J. J. Laass

INVENTOR
Alexander Dey
BY
Duell, Laass & Duell
ATTORNEYS (No Model.) 7 Sheets—Sheet 6.
A. DEY.
WORKMAN'S TIME RECORDER.
No. 411,586. Patented Sept. 24, 1889.
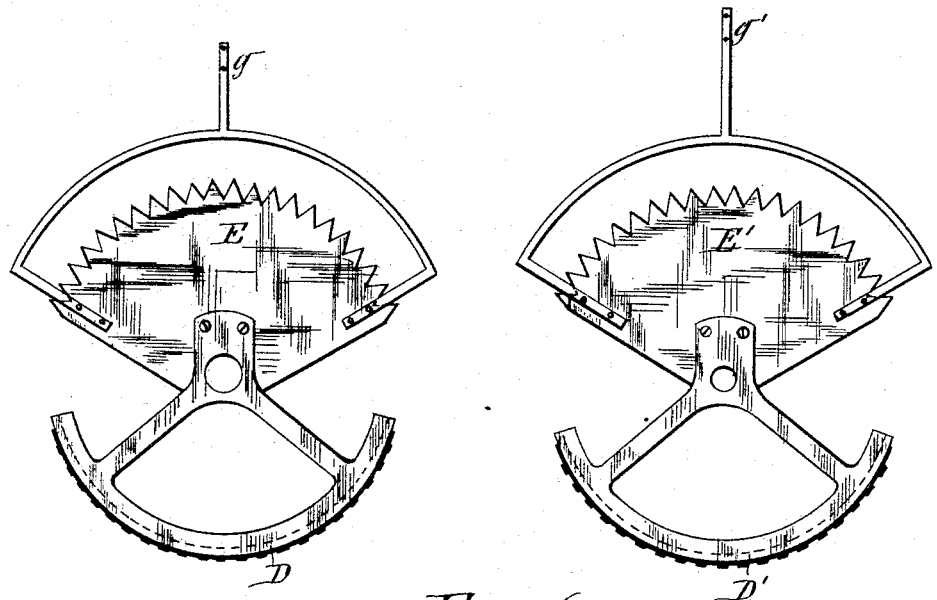
Fig. 6
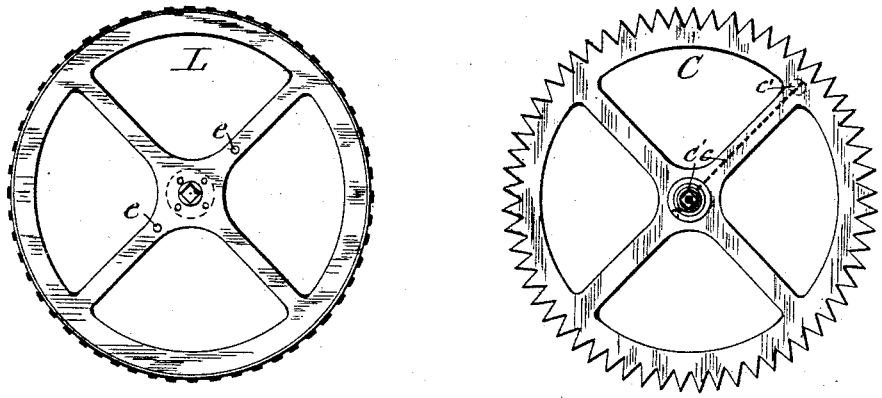
WITNESSES:
C. L. Bendixon
J. J. Laass
INVENTOR
Alexander Dey
BY
Duell, Laass & Duell
ATTORNEYS (No Model.) 7 Sheets—Sheet 7.

A. DEY.
WORKMAN'S TIME RECORDER.

No. 411,586. Patented Sept. 24, 1889.

WITNESSES:

INVENTOR: Alexander Dey
BY
ATTORNEYS

UNITED STATES PATENT OFFICE.

ALEXANDER DEY, OF GLASGOW, COUNTY OF LANARK, SCOTLAND.

WORKMAN'S TIME-RECORDER.

SPECIFICATION forming part of Letters Patent No. 411,586, dated September 24, 1889.

Application filed May 3, 1889. Serial No. 309,421. (No model.) Patented in England February 3, 1888, No. 1,614.

*To all whom it may concern:*

Be it known that I, ALEXANDER DEY, a subject of the Queen of Great Britain, residing at Glasgow, in the county of Lanark, in Scotland, have invented new and useful Improvements in Time-Recorders, (for which I have obtained a patent in Great Britain February 3, 1888, No. 1,614,) of which the following, taken in connection with the accompanying drawings, is a full, clear, and exact description.

This invention consists in a novel construction and combination, with a clock, of mechanisms by means of which employés of shops, factories, and other establishments may be enabled to record the time of their entering and leaving their place of business, and thus save the extra expense of watchmen or time-keepers usually employed for the aforesaid purpose.

Figure 2:
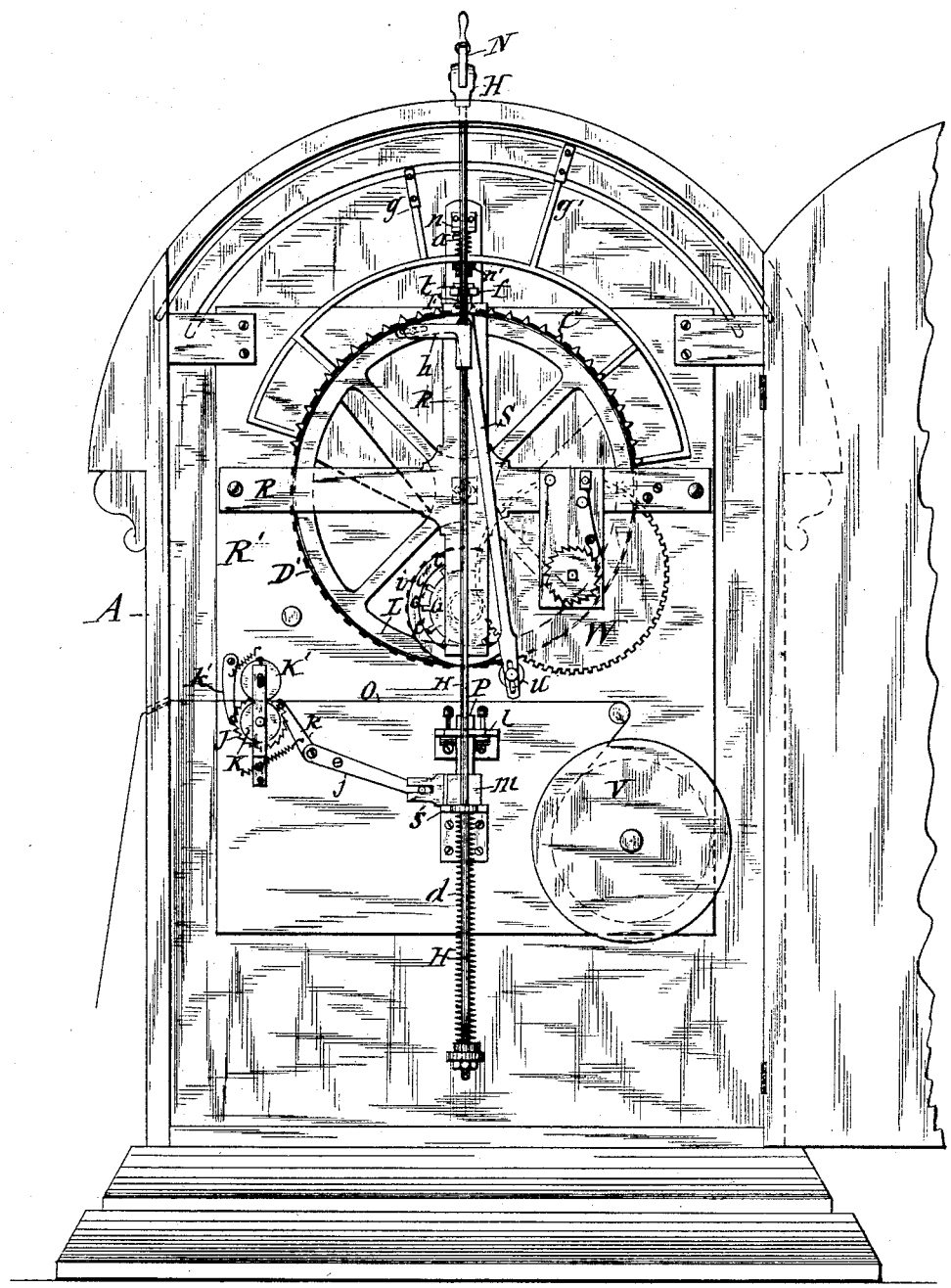
Figure 3:
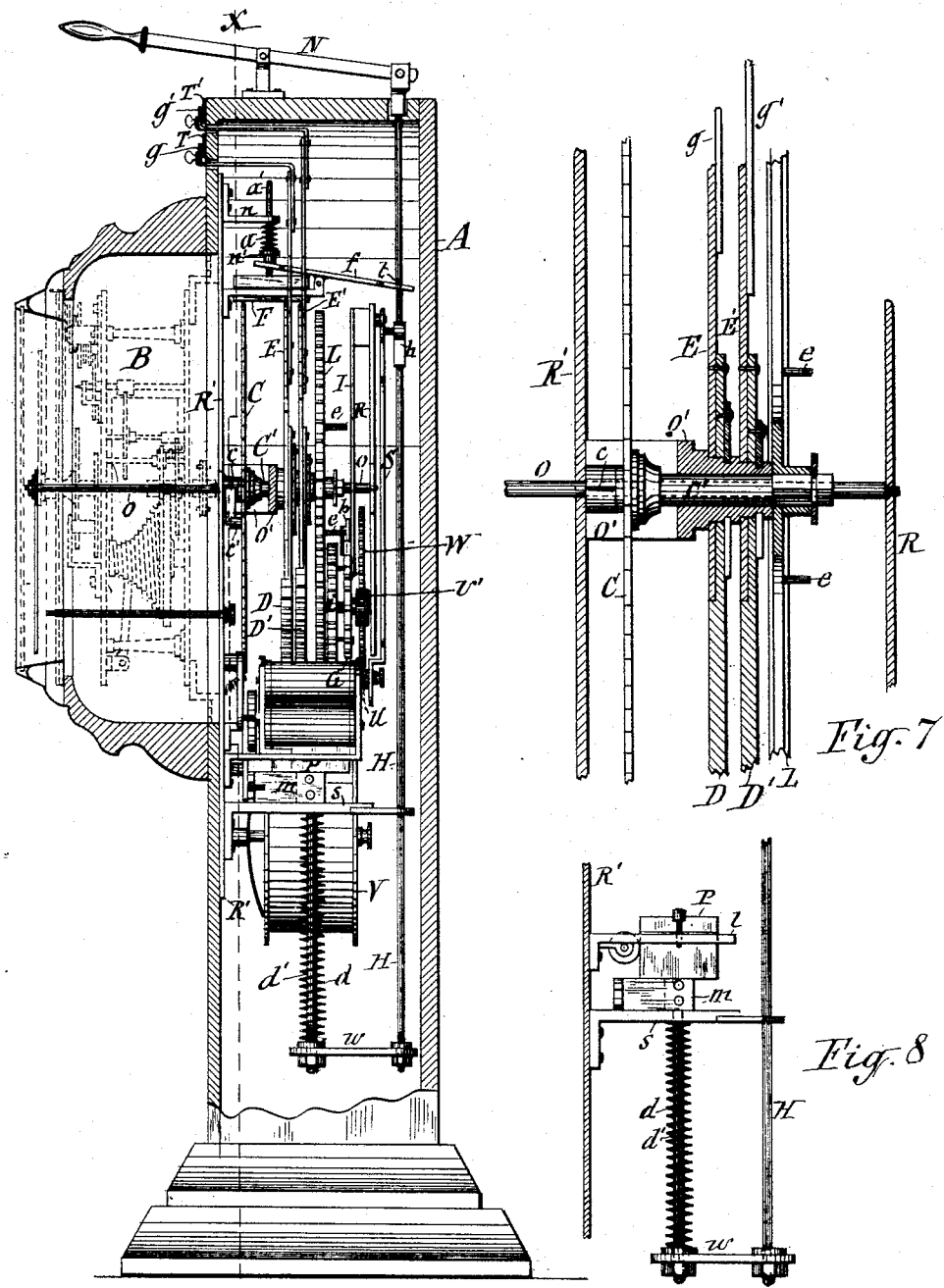
Figure 4:
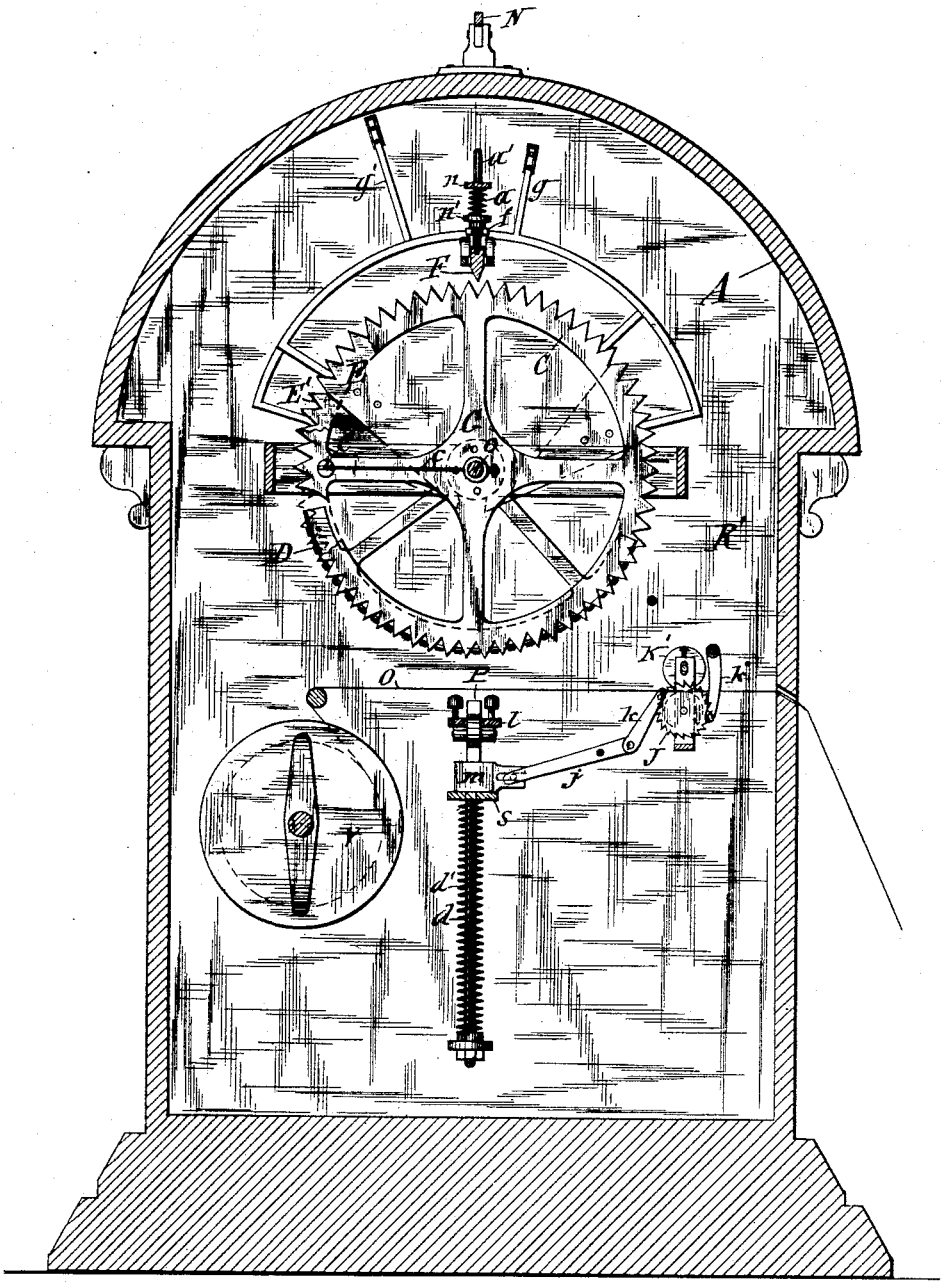
Figure 5:
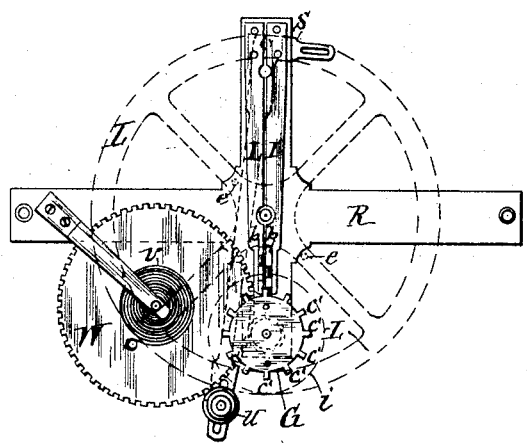
Figure 9:
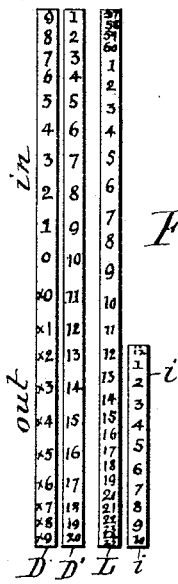
Figure 10:
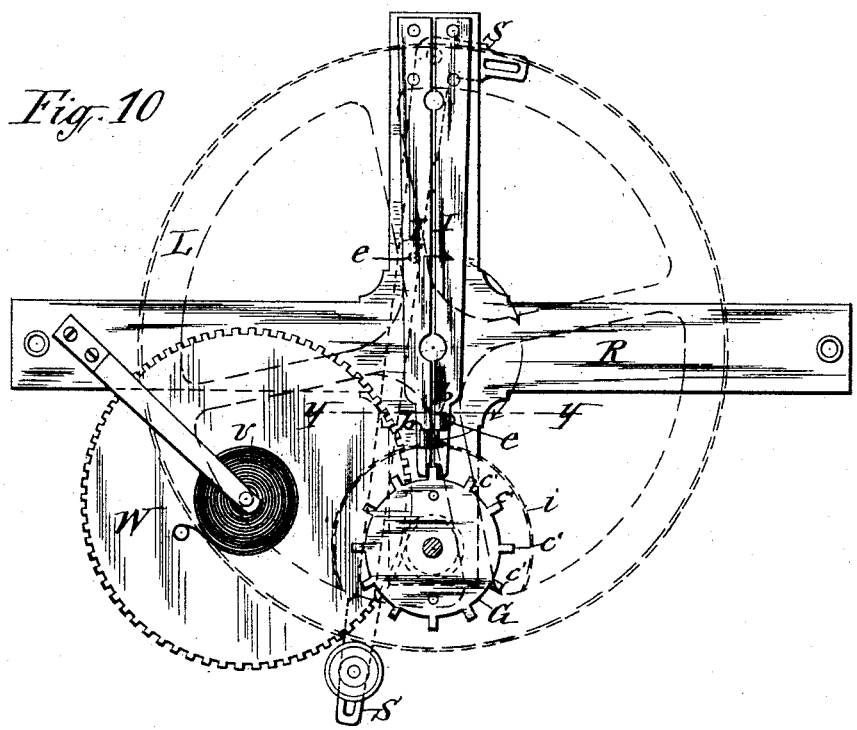
Figure 11:
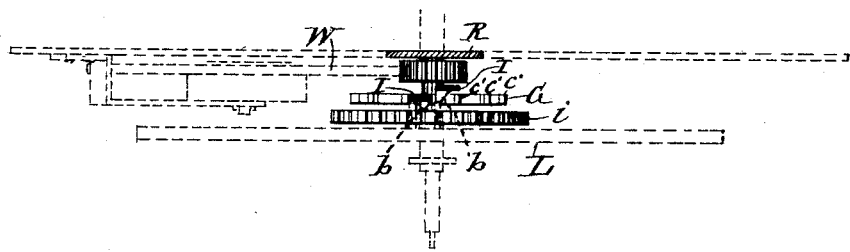

The invention is fully illustrated in the annexed drawings, in which Figure 1 is a front elevation of my improved time-recording apparatus. Fig. 2 is a rear view of said apparatus with the door opened to illustrate the inclosed mechanisms. Fig. 3 is a side elevation having the greater portion of the side plate of the case broken away to illustrate the inclosed mechanisms. Fig. 4 is a vertical transverse section on line $x\,x$, Fig. 3, viewed from the front of the apparatus. Fig. 5 is a detail view of the hour-wheel and its actuating mechanism. Fig. 6 represents detached plan views of the respective type-wheels and racks. Fig. 7 is an enlarged sectional view of the axial supports of the various wheels and minute-hand spindle. Fig. 8 is a detail view of the connection of the plunger with the platen. Fig. 9 presents face views of the different type-wheels. Fig. 10 is an enlarged face view of the escapement which controls the movement of the hour-wheel; and Fig. 11 is a transverse section of the same on line $y\,y$, Fig. 10.
Similar letters of reference indicate corresponding parts.

A represents a case, of any suitable form, inclosing the clock mechanism B and the recording mechanism, hereinafter described.
The clock mechanism may be of any suitable and well-known type, and is therefore represented merely by dotted lines, the only part of said mechanism which is shown in full lines being the minute-handle spindle $o$, from which the greater portion of the recording mechanism partakes motion. On this spindle is mounted loosely the wheel C, which is provided in its periphery with V-shaped notches, as shown in Fig. 6 of the drawings, and has affixed to it an elongated hub or sleeve C', surrounding the said spindle, and to a squared end portion of this sleeve is firmly secured a time-printing type-wheel L, so as to compel the latter to rotate with the sleeve, which latter is caused to turn with the minute-hand spindle by means of a spring $c$, projecting from a collar rigidly secured to the spindle $o$, the end of which spring is secured to a stud-pin $c'$, secured to the wheel C. This yielding connection of the wheels C and L with the minute-hand spindle $o$ is necessary, in order to allow the type-wheel L to register with other type-wheels, hereinafter described.

The type-wheel L presents on its peripheral face consecutive numbers from 0 to 60, uniformly distributed around the said face.

To the frame R' is rigidly secured a tubular hub O', through which the sleeve C' passes, and on the said hub are mounted loosely the recording type-wheels D D', as shown in Fig. 7 of the drawings. Said type-wheels are thus rotary independently of the time-printing type-wheel L. They are provided, respectively, with segmental racks E E', formed with V-shaped notches corresponding to those of the wheel C. To the wheels D D' are attached indicators $g\,g'$, which extend through segmental slots in the front plate of the case, which latter has affixed to it index-plates T T', as shown in Fig. 1 of the drawings.

The types of the wheels D D' represent numbers, those of the wheel D being arranged in two sets ranging from 0 to 9 and running from the center of the face of the wheel in opposite directions, as illustrated in Fig. 9 of the drawings, and the index-plate T, to which the indicator $g$ of the wheel D points, is numbered correspondingly. One set of the numbers on the index-plate T is marked "In" and the other set is marked "Out," and the set of numbers on the wheel D, corresponding to the set marked "Out," as aforesaid, has a star at the side of each number. The numbers on the wheel D' range from 1 to 20, distributed uniformly over the length of the face of said wheel, and the index-plate T, to which the indicator g' of said wheel points, is numbered in the same manner.

G denotes the hour-wheel, which receives motion from a driving-wheel W, which is independent of the clock mechanism B, and operated by a coil-spring v, connected at one end to the wheel W and at the opposite end to the stationary support of the wheel, as illustrated in Fig. 5 of the drawings, said driving-wheel meshing with a pinion v', attached to the hub of the hour-wheel. To the opposite side of this hour-wheel is rigidly secured a type-wheel i, bearing the numbers from 1 to 12, consecutively distributed over the peripheral face thereof, as represented in Fig. 9 of the drawings.

The motion of the hour-wheel is controlled so as to harmonize with the movement of the clock mechanism by means of an escapement mechanism receiving motion from the minute-hand spindle, said escapement mechanism consisting of two detents of the form of elongated spring-plates I I, which are arranged vertically lengthwise side by side, and are rigidly attached at their upper ends and suspended from a bridge R, secured to the supporting-frame R' of the mechanism. The hour-wheel G has projecting from its periphery teeth $c'$ $c'$, uniformly distributed around the same, and the lower or free ends of the aforesaid detents lie normally in the path of said teeth. To the sides of the detents, facing the type-wheel L, are attached cams $b$ $b$, that of one detent being below that of the other detent, and from the adjacent side of the type-wheel L project lugs or spurs $e$ $e$ in such relative positions that one is caused to traverse one of the cams $b$, and the other traverses the other of said cams, and said spurs are of such lengths that in the rotation of the wheel L the aforesaid spurs are caused to come in contact with the cams, and thereby crowd the detents I I alternately laterally out of engagement with the teeth of the hour-wheel G, so that said wheel is allowed to move intermittently the distance from tooth to tooth.

P represents a platen, which faces the respective type-wheels D, D', L, and i, and is adapted to slide toward and from the same in a guide l, secured to the frame R', as illustrated in Fig. 2 of the drawings. This platen is operated by a plunger H, extended vertically through the top of the case A, and having its lower end connected by an arm w to a stem d', projecting downward from the platen. The upper end of the plunger is connected to one end of a lever N, which is pivoted to the top of the case A, and has its opposite end projecting to the front of said case, so as to be convenient of access for the operator.

F represents a detent, which is V-shaped to correspond to the V-shaped notches of the wheels C and racks E E', with which said detent is adapted to engage. Said detent is provided with a stem a', which passes through a guide n, secured to the frame R', as shown in Fig. 3 of the drawings. By means of a spiral spring a, surrounding the stem a', between the under side of the guide n and a collar n' on said stem, the detent F is forced toward the wheel C and racks E E', and it is held normally out of engagement therewith by means of a lever f, pivoted to a fixed support intermediate of its length and bearing with one end against the under side of the collar n', and having its opposite end passing under a pin t, projecting from opposite sides of the plunger H, as best seen in Fig. 2 of the drawings. Between the arm w and a fixed plate s is an expansive spiral spring d, surrounding the stem d', and exerting a downward force on the arm w and plunger H, connected thereto. Said downward force, overcoming the force of the spring a, causes the detent F to be held normally out of engagement with the wheel C and racks E E' by means of the lever f.

S represents a bell-crank lever pivoted to the bridge R, and having one of its arms connected with an arm h, secured to the plunger H. The other arm of the lever S projects beyond the periphery of the hereinbefore-described type-wheels, and has adjustably connected to it the inking-roller U by the attaching-screw thereof passing through a longitudinal slot in the lever, as shown in Figs. 2 and 5 of the drawings.

O denotes the impression-receiving ribbon or band, which is wound upon a spool V in the usual manner, and passes thence between the platen P and type-wheels D, D', L, and i, and thence between feed-rolls K K', by means of which latter it is drawn along during each operation of the recording mechanism, said feed-rolls receiving motion from the platen P, to which is secured a block m, and to the frame R' is pivoted a lever j, one end of which is connected with the block m and the opposite end has connected to it a pawl k, which engages a ratchet J, attached to the end of the feed-roll K, as shown in Fig. 2 of the drawings. The platen P in receding from the type-wheels causes the lever j to push the pawl toward the ratchet J, and thereby impart a partial rotation to the feed-roll K. A dog k', pivoted to the frame R' and engaging the ratchet, serves to prevent reverse motion of the feed-roll.

The operation of my described invention is as follows, to wit: Each person required to record his or her time is designated by a certain number contained on the index-plates T or T', or both combined, and before recording his or her time he or she must move the indicator or indicators g g' to the number on the plate or plates T T' corresponding to the number by which said person is designated. In doing this the type-wheels D D' are set in positions to bring corresponding numbers opposite the platen. The clock mechanism B being in motion causes the minute-hand spindle o to rotate the time-printing type-wheel L and notched wheel C synchronously with said spindle, and the hour-wheel H, with its type-wheel i, is caused to move at the requisite proportion of speed by the escapement mechanism I I and e e, hereinbefore described. The person recording his or her time having set the indicators g' g in their requisite positions, as aforesaid, depresses the free end of the lever N, and thereby causes the plunger H to be drawn up, and thus allow the detent F to drop into engagement with the notched wheel C and racks E E' and hold the same stationary during the movement in which the plunger H throws the platen up toward the type-wheels and causes the latter to impress the band O, the type-wheels D D' impressing the number of the person recording his or her time and the type-wheels i and L impressing the hour and minute of recording. It is the momentary detention of the movement of the wheel C and type-wheel L which requires the spring-connection of said parts to the minute-spindle o, as hereinbefore described. As soon as the recording is effected the lever N is to be released by the operator, and the wheel C and type-wheel L are then allowed to proceed with the movement of the minute-hand spindle.

When desired to record the time of entering the place of business, the operator is to turn the indicator g toward the side of the plate T, marked "In," and in recording the time of leaving the place of business the operator must turn the said indicator toward the side of the plate marked "Out," and this latter movement turns that portion of the type-wheel D over the platen P, which bears a star opposite each number, said star distinguishing the time of leaving from the time of entering the place of business. The connection of the lever S with the plunger H causes the inking-roller to be moved over the faces of the type-wheels in one direction during the ascent of the plunger and in the opposite direction by the descent of the plunger and thus the types are automatically supplied with ink.

Having described my invention, what I claim as new, and desire to secure by Letters Patent, is—

1. The combination, with the clock mechanism and minute-hand spindle, of a time-printing type-wheel arranged rotary with said spindle, recording type-wheels arranged concentric with the time-printing type-wheel and rotary independently thereof, indicators on the recording type-wheels, a plunger movable at will of the operator, a platen connected to the plunger and facing the respective type-wheels, and an impression-receiving band passing between the type-wheels and platen, as set forth.

2. The combination, with the clock mechanism and minute-hand spindle, of a time-printing type-wheel arranged rotary with said spindle, recording type-wheels arranged concentric with the time-printing type-wheel and rotary independently thereof, indicators on the recording type-wheels, a detent actuated by the plunger and adapted to engage the recording type-wheel, a platen carried on the plunger and facing the respective type-wheels, and an impression-receiving band passing between the type-wheels and platen, substantially as set forth.

3. The combination, with the clock mechanism and minute-hand spindle, of a time-printing type-wheel arranged rotary with said spindle, recording type-wheels arranged concentrically with the time-printing type-wheel and rotary independently thereof, indicators on the recording type-wheels, segmental racks having V-shaped notches and rigidly attached to and concentric with the latter type-wheels, a plunger movable at will of the operator, a V-shaped detent actuated by the plunger and adapted to engage the notches of the aforesaid racks, a platen carried on the plunger and facing the respective type-wheels, and an impression-receiving band passing between the type-wheels and platen, substantially as set forth and shown.

4. In combination with the clock mechanism and minute-hand spindle, a wheel mounted loosely on said spindle and provided with V-shaped notches in its periphery, a spring connecting said wheel to the spindle, a type-wheel fixed to the hub of the aforesaid wheel, a V-shaped detent adapted to engage the notched wheel, a plunger movable at will of the operator and actuating the detent, a platen carried on the plunger and facing the type-wheel, and an impression-receiving band passing between the type-wheel and platen, substantially as described and shown.

5. In combination with the clock mechanism and minute-hand spindle, a driving-wheel independent of the clock mechanism, an hour-wheel receiving motion from said driving-wheel, and an escapement mechanism receiving motion from the minute-hand spindle and controlling the movement of the said hour-wheel, as set forth.

6. In combination with the clock mechanism and minute-hand spindle, a driving-wheel independent of the clock mechanism, an hour-wheel receiving motion from said driving-wheel, an escapement mechanism receiving motion from the minute-hand spindle and controlling the movement of the hour-wheel, a type-wheel fastened to the side of the hour-wheel, a platen movable toward and from the said type-wheel, and an impression-receiving band passing between said platen and type-wheel, substantially as described and shown.

7. In combination with the clock mechanism and minute-hand spindle, a wheel mounted on and rotating with the said spindle, a driving-wheel independent of the clock mechanism, an hour-wheel receiving motion from said driving-wheel and provided with an annular row of teeth, detents normally in the path of said teeth, and projections on the aforesaid wheel of the minute-hand spindle disposed in such positions that each of said projections encounters one of the aforesaid detents and throws the same out of the path of the teeth of the hour-wheel, a type-wheel attached to the side of the hour-wheel, a platen movable toward and from the said type-wheel, and an impression-receiving band passing between the platen and type-wheel, substantially as described and shown.

8. In combination with the case A, clock mechanism, and minute-hand spindle, the wheel C, provided with V-shaped notches in its periphery and provided also with the sleeve C', mounted loosely on said spindle, the spring $c$, secured at opposite ends, respectively, to the spindle and to the wheel C, the tubular hub O', secured to the frame, the type-wheels D D', mounted loosely on the said hub, the segmental racks E E', rigidly attached to said type-wheels and having V-shaped notches, the detent F, arranged movably toward and from the aforesaid V-shaped notches, the spring $a$, forcing the detent toward said notches, the type-wheel L, secured to and rotating with the sleeve C', the driving-wheel W, independent of the clock mechanism, the hour-wheel G, receiving motion from said driving-wheel and provided with teeth $c'$ $c'$, the detents I I', normally in the path of said teeth, cams $b$ $b$, affixed to the latter detents, projections $e$ $e$ on the type-wheel L, and each traversing one of the aforesaid cams, the type-wheel $i$, attached to the side of the hour-wheel G, the platen P, facing the respective type-wheels, the plunger H, connected with the platen, the spring $d$, forcing the platen from the type-wheels, the lever $f$, pivoted intermediate of its length and connected at opposite ends, respectively, with the detent F and plunger H, the lever N, pivoted on the case and connected with the aforesaid plunger, the index-plates T T', secured to the exterior of the case, and indicators $g$ $g'$, attached, respectively, to the type-wheels D D', all combined to operate substantially as set forth.

9. In combination with the type-wheels D, D', and L, platen P, and plunger H, connected with said platen, the bridge R, lever S, pivoted to said bridge, inking-roller U, pivoted to said lever, and the arm $h$, attached to the plunger and coupled to the lever S, substantially as described and shown.

10. In combination with the type-wheels D, D', and L, and platen P, arranged movably toward and from said type-wheels, the spool V, feed-rolls K K', ratchet J, attached to one of said rolls, the lever $j$, connected at one end with the platen, the pawl $k$, connected to the opposite end of the lever, the dog $k'$, engaging the ratchet, and the band O, passing from the spool between feed-rolls, substantially as described and shown.

In testimony whereof I have signed my name to this specification in the presence of two subscribing witnesses.

ALEXANDER DEY.

Witnesses:
EDMUND HUNT,
DAVID FERGUSON.